United States Patent [19]

Van Gestel

[11] Patent Number: 5,691,776
[45] Date of Patent: Nov. 25, 1997

[54] METHOD OF TRANSMITTING TELTEXT PAGES INCLUDING AN INDEX TABLE WITH A CODE FOR SELECTING PARTICULAR AND COMMON EXTENSION PAGES TO ENHANCE BASIC PAGES

[75] Inventor: Henricus A. W. Van Gestel, Eindhoven, Netherlands

[73] Assignee: U.S. Philips Corporation, New York, N.Y.

[21] Appl. No.: 657,495

[22] Filed: Jun. 4, 1996

Related U.S. Application Data

[63] Continuation of Ser. No. 353,840, Dec. 12, 1994, abandoned.

[30] Foreign Application Priority Data

Jun. 16, 1994 [EP] European Pat. Off. ............ 94201729

[51] Int. Cl.⁶ ............................ H04N 7/08; H04N 7/087
[52] U.S. Cl. ........................ 348/467; 348/465; 348/468; 348/478
[58] Field of Search ........................ 348/461, 465, 348/467, 468, 473, 478; H04N 7/08, 7/087

[56] References Cited

U.S. PATENT DOCUMENTS

| | | | |
|---|---|---|---|
| 4,614,972 | 9/1986 | Motsch et al. | 348/468 |
| 4,698,677 | 10/1987 | Kinghorn et al. | 348/468 |
| 4,933,764 | 6/1990 | Kinghorn | 348/468 |
| 4,953,022 | 8/1990 | Bugg | 348/468 |
| 5,355,170 | 10/1994 | Eitz et al. | 348/468 |

FOREIGN PATENT DOCUMENTS 9013970  11/1990  WIPO .......................... H04N 7/087

OTHER PUBLICATIONS

K. Van Bruwaene, "De Evolutie Van Teletekst", 8251 Revue HF X111, No. 10, 1987, pp. 283–296.

*Primary Examiner*—John K. Peng
*Assistant Examiner*—John W. Miller
*Attorney, Agent, or Firm*—David R. Treacy

[57] ABSTRACT

Teletext page signals are transmitted in a format providing basic pages and extension pages, and a table which includes a code for indexing extension pages to the basic pages with which they are to be used. The code includes a multibit value for selecting an extension page from a list, and a single bit for selecting or not selecting a predetermined common extension page. Each extension page includes signals for enhancing the basic page or pages to a higher level display.

15 Claims, 4 Drawing Sheets

| 1FE | | | | | | | | | | | | | | | | | 10.47:00 |
|---|---|---|---|---|---|---|---|---|---|---|---|---|---|---|---|---|---|
| 100 | 1 | 2 | 2 | 2 | 0 | 0 | 0 | 0 | 0 | 1 | 2 | 2 | 3 | 3 | 0 | 0 | 0 | 0 |
| 120 | 1 | 4 | 4 | 5 | 4 | 0 | 0 | 0 | 0 | 1 | 3 | 6 | 6 | 6 | 6 | 6 | 7 | 0 |
| 140 | 1 | 8 | 8 | 0 | 0 | 0 | 0 | 0 | 0 | 1 | 9 | 9 | 9 | A | A | 9 | A | 0 |
| 160 | 0 | 0 | 0 | 0 | 0 | 0 | 0 | 0 | 0 | 0 | 0 | 0 | 0 | 0 | 0 | 0 | 0 | 0 |
| 180 | 0 | 0 | 0 | 0 | 0 | 0 | 0 | 0 | 0 | 0 | 0 | 0 | 0 | 0 | 0 | 0 | 0 | 0 |

1C0   1C1   1C2   1C3   1C4   1C5   1C6   1C7
1C8   1C9

| 1C0 | | 10.47:00 |
|---|---|---|
| 100 | xxx | |
| 110 | yyy | |
| 111 | zzz | |

|      |   |   |   |   |   |   |   |   |   |   |   |   |   |   |   |   |   |
|------|---|---|---|---|---|---|---|---|---|---|---|---|---|---|---|---|---|
| 1FE  |   |   |   |   |   |   |   |   |   |   |   |   |   | 10 . 47 : 00 | | | |
| 100  | 8 | 0 | 0 | 0 | 0 | 0 | 0 | 0 | 8 | 9 | 9 | 1 | 1 | 0 | 0 | 0 | 0 |
| 120  | 8 | 9 | 9 | 9 | 2 | 0 | 0 | 0 | 8 | A | A | A | A | A | 3 | 0 | 0 |
| 140  | 8 | 4 | 4 | 0 | 0 | 0 | 0 | 0 | 8 | 5 | 6 | 7 | B | C | D | D | 0 |
| 160  | 0 | 0 | 0 | 0 | 0 | 0 | 0 | 0 | 0 | 0 | 0 | 0 | 0 | 0 | 0 | 0 | 0 |
| 180  | 0 | 0 | 0 | 0 | 0 | 0 | 0 | 0 | 0 | 0 | 0 | 0 | 0 | 0 | 0 | 0 | 0 |
| 1EF  |   |   | 1C1 |   | 1C2 |   | 1C3 |   | 1C4 |   | 1C5 |   | 1C6 | | | | |

METHOD OF TRANSMITTING TELTEXT PAGES INCLUDING AN INDEX TABLE WITH A CODE FOR SELECTING PARTICULAR AND COMMON EXTENSION PAGES TO ENHANCE BASIC PAGES

This is a continuation of application Ser. No. 08/353,840, filed Dec. 12, 1994, abandoned.

BACKGROUND OF THE INVENTION

The invention relates to a method of transmitting teletext pages including a plurality of basic pages and at least one extension page for enhancing said basic pages, as well as a table of codes for linking a basic page to said extension page. The invention also relates to a transmission station and a teletext receiver.

The majority of commercially available teletext decoders is adapted to display the pages in a standard display format, which is often referred to as Level 1. The Level 1 format is limited in the sense that, for example only 96 alpha-numerical and 64 graphic characters can be displayed, only one letter type is provided, only saturated colours are possible, and the like. Pages in the Level 1 display format will hereinafter be referred to as basic pages.

Meanwhile, higher levels have been provided. For example, Level 2 provides an extension of the character set and a more extensive pallet of colours. An even higher level is Level 3 which adds facilities such as dynamically redefinable character sets, italicized and bold letter display and the like to Level 2. For teletext decoders of such a higher level extension signals are transmitted for enhancing the basic pages with additional features.

Pages 76–83 of "Teletext Specification", Interim Technical Document SPB 492, published by the European Broadcasting Union in December 1992 describes a method of accommodating said extension signals in extension pages. The desired linking of basic pages to extension pages is effected by means of a control page in which a code table and a page-linking list are incorporated. To illustrate this known method, FIG. 1A shows a control page for the basic pages in magazine 1 (the plurality of teletext pages whose 3-digit number starts with the digit 1). In this example the control page has the (hexadecimal) page number 1FE. The control page comprises a code table 100 and a page-linking list 101. Each position of the code table corresponds to a teletext page number. In FIG. 1A the first row of the table corresponds to basic pages 100–119, the second row corresponds to basic pages 120–139, etc. and the last row corresponds to basic pages 180–199. Each table position accommodates a code for, inter alia linking the relevant basic page to an extension page. Each code comprises, for example 4 bits and then has a value in the range of 0–F. Here, the code 0 means that the relevant page is not transmitted. It appears from FIG. 1A that the basic pages 100–103, 110–114, 120–124, 130–137, 140–142 and 150–158 are present in the transmission. Some values of the code indicate that an extension page accommodates extension signals for enhancing the relevant page. The relevant extension pages are summed up in the page-linking list 101. In the relevant example the extension pages 1C0–1C9 are transmitted.

FIG. 1B shows an example of extension page 1C0. The page comprises a field 102 with page numbers and a field 103 with enhancement data. It has been attempted to show in FIG. 1B that basic page 100 must be enhanced with data xxx by teletext decoders of a higher level than Level 1, for example for displaying an additional title in a different letter type and colour. Moreover, the Figure shows that page 110 must be enhanced with data yyy, for example for displaying a pictogram, etc. The page numbers in field 102 of the extension pages need not be mentioned in a given sequence.

A drawback of the known method is that the enhancement data for a given basic page must be searched by scanning the contents of the extension pages. To this end, all extension pages mentioned in the list must have been previously received and stored.

SUMMARY OF THE INVENTION

It is an object of the invention to provide a method of transmitting teletext pages with which the above-mentioned drawbacks are obviated.

To this end the method according to the invention is characterized in that each code comprises a bit for linking the basic page to a predetermined extension page and a multibit value for identifying a further extension page. It is thereby achieved that one or two extension pages are directly addressed so that scanning of a plurality of pages is no longer necessary.

The predetermined extension page preferably comprises extension signals which are common for a plurality of basic pages. In practice this situation occurs frequently. For example, the predetermined extension page may define one or more pictograms which are used in a great many pages. It is now sufficient to define such a pictogram once and transmit it in the common extension page. A basic page is subsequently linked, as desired, to the common extension page for display of the pictogram and to an individual extension page for other enhancement data.

A teletext receiver comprises decoding means for decoding the table, acquisition means for acquiring at least one basic page and extension pages linked thereto, and display means for displaying a page in conformity with signals which are accommodated in the basic page and the extension page linked thereto. In accordance with the invention, the receiver is adapted to acquire a predetermined extension page in response to a bit of the code and to acquire a further extension page identified by a multibit value of the code.

BRIEF DESCRIPTION OF THE DRAWING

FIG. 2 shows diagrammatically a teletext transmission system to explain the method according to the invention. The system comprises a transmission station 1, a transmission medium 2 and a receiver 3. The transmission station comprises a television signal generator 11, a teletext signal generator 12, a teletext inserter 13 and a modulator 14. The television generator 11 generates a picture signal TV, the teletext generator 12 generates a teletext signal TX. Both signals are combined in teletext inserter 13 to a video signal which is applied to the modulator 14 and transmitted via transmission medium 2. The receiver 3 comprises a tuner 31 for demodulating the video signal. The demodulated video signal CVBS is applied for further processing and display to a television monitor 32. The video signal is also applied to a teletext decoder 33. This decoder decodes the teletext signal accommodated therein and applies a teletext picture signal RGB to the television monitor 32.

The teletext signal TX comprises a plurality of pages which are transmitted successively. Generally, the pages are clustered in groups in magazines. Each page comprises a header (accommodating, inter alia the page number) and a maximum of 25 text rows. The transmission of a teletext page starts with, and implies, the header of this page and subsequently comprises the relevant text rows. The page number is a 3-digit number and starts with the magazine number M. The page number of basic pages is generally between 100 and 899 in order that the user can select the pages by means of a decimal keyboard. For Level 2 and/or Level 3 display of a page, extension signals for this page are accommodated in one or more extension pages. A value outside the range between 100 and 899 is often chosen as the page number for these extension pages by using the hexadecimal values A-F for a digit. Generally, the pages are transmitted in a repetitive cycle. For the purpose of illustration, FIG. 3 shows a part of such a cycle. The cycle comprises by way of example, teletext pages 100-103, 110-114, 120-124, 130-137, 140-142 and 150-158, extension pages 1EF and 1C1-1C6, and a control page 1FE. Only a part of the cycle is shown in the Figure.

The invention will now be further described with reference to an example. To this end, FIG. 4 shows a teletext page 40 in Level 3 format. The page has a portion 401 (for example a pictogram) which cannot be displayed by means of the conventional Level 1 decoders. The pictogram is defined by data which are accommodated in an extension page 41 having page number 1EF. It has been assumed that the same pictogram is also used in a large number of other pages in magazine 1. Teletext page 40 further has a portion 402 (for example a word in a different letter type) which can neither be displayed by means of Level 1 decoders. This portion is defined in a further extension page 42, for example page 1C1.

FIG. 5 shows an example of the control page 1FE. The page numbers of the extension pages which are used within magazine 1 are summed up in a list 50. As is shown in the Figure, the list comprises six (hexadecimal) page numbers 1C1-1C6 in this example. Moreover, the control page has a page number 51 (1EF) of a common extension page. The control page further comprises a table 52 with codes. Each code covers two character positions of a row and is protected by protection bits. For indexing extension pages, four bits of the code are used in this example, so that each code has a value in the range 0-F. The most significant bit of the code identifies by means of the value '1' (codes 8-F) that extension signals for the relevant basic page are accommodated in the common extension page 1EF. The Figure shows that this is applicable to many basic pages (100, 110-112, 120-123, 130-136, . . . ). The other three bits address one of the extension pages of list 50 in the manner described hereinbefore. For example, basic page 113 (code 1) is enhanced with extension signals from extension page 1C1 (the first page of list 50). Basic page 123 (code 9) is enhanced with extension signals of both the common extension page 51 and the first extension page of list 50. This is in conformity with the example shown in FIG. 4. The code 0 indicates that no extension page is linked to the relevant page. The relevant basic page is then either absent in the transmission, or it is a Level 1 page which does not require enhancement. In this example, basic pages 101 and 102 are transmitted without any further enhancement.

FIG. 6 shows in greater detail the teletext decoder denoted by 33 in FIG. 1. The decoder comprises a data slicer 61 for regaining the data packets from the video signal CVBS, an acquisition circuit 62 for selecting the data packets of a desired page, a memory 63 for storing the selected data packets and a character generator 64 for displaying a page. The decoder further comprises a microprocessor 65. Said microprocessor may read and write the memory 63 via a communication bus 66. Particularly, the microprocessor may read and process received data packets and write the result of the processing operation into the memory for display by the character generator.

The operation of the teletext decoder shown in FIG. 6 is determined by a control programme which is stored in the microprocessor. FIG. 7 shows the flow chart of this control programme. It has been assumed that the teletext decoder is adapted to display teletext pages in Level 3 format. In a step 70 the microprocessor starts the acquisition of a desired page, for example page 123, as well as the acquisition of the control page comprising the code table for magazine 1. This control page has a predetermined page number 1FE. Generally, the control page will have been previously received and stored. If this is not the case, a waiting time will be observed for the reception of the control page. In a step 71 the code C in the control page is read, which corresponds to page 123. This code is at the seventh and eighth character positions of the second text row (see FIG. 5). For page 123 the code has the value 9 (binary 1001). In a step 72 the read 4-bit code is split into a most significant bit $C_m$ and a 3-bit value $C_1$. In a step 73 it is subsequently ascertained whether $C_m$ has the value 1. If this is the case, the control programme reads, in a step 74, the predetermined page number 51 (see FIG. 5) which is mentioned at a fixed position of the control page. This is the page number (here 1EF) of the common extension page. Moreover, the acquisition of the common extension page is started in the step 74, if this page has not been previously received and stored. If $C_m$ has the value 0, the common extension page does not play any further role. In a step 75 the value of $C_1$ is subsequently searched. If $C_1$ has a value which is unequal to zero, then a step 76 is performed. In this step the page number of list 50 (see FIG. 5) is read whose sequential number corresponds to the value of $C_1$. For page 123 ($C_1$=1) this is the first page number 1C1. Moreover, the acquisition of the extension page thus found is started. If $C_1$ has the value zero, then the acquisition of such an extension page of the list is dispensed with. The control programme is ended in a step 77 in which the page 123 to be displayed is composed of basic page 123, common extension page 1EF and further extension page 1C1.

Figures 1A, 1B, 2:
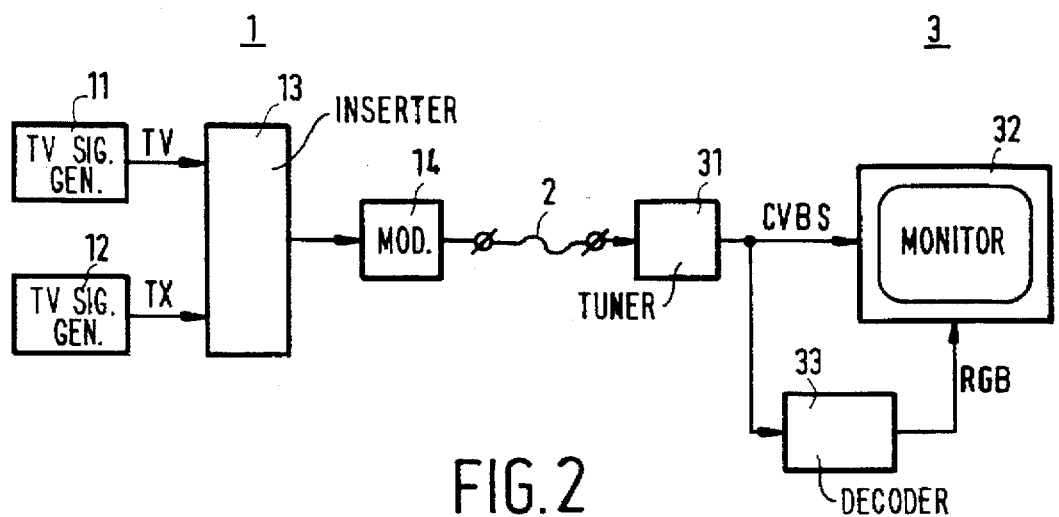
FIGS. 1A and 1B which have already been described, show a control page and an extension page to explain the known method of transmitting teletext pages.
FIG. 2 shows diagrammatically a teletext transmission system to explain the method according to the invention.
Figure 3:
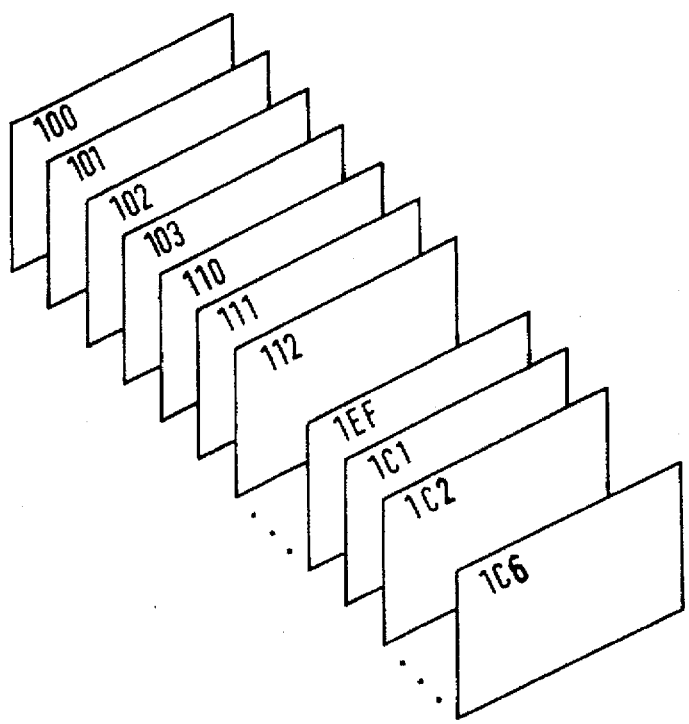
FIG. 3 shows a part of a cycle of teletext pages which is transmitted by a transmission station shown in FIG. 2.
Figure 4:
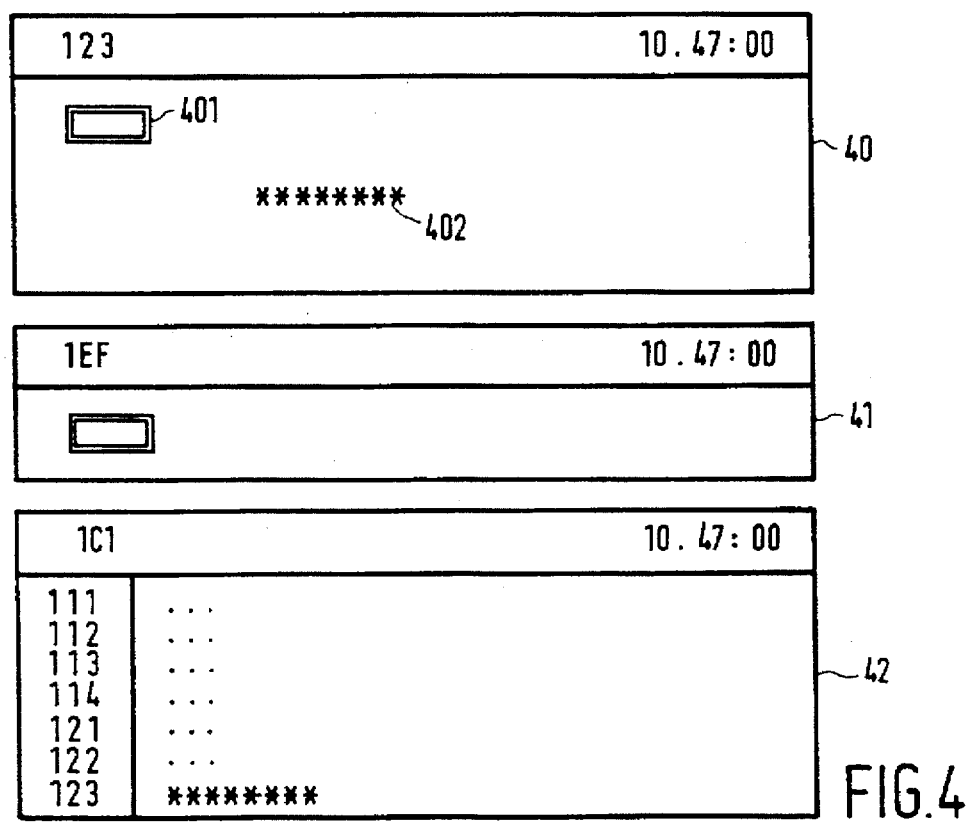
FIG. 4 shows an example of a teletext page to be displayed.
Figures 5, 6:
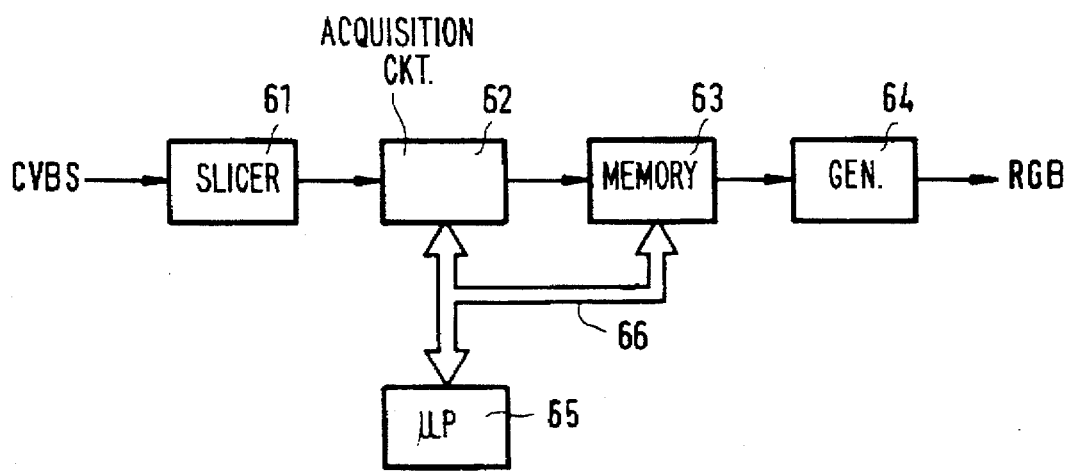
FIG. 5 shows an example of a control page to explain the method according to the invention.
FIG. 6 shows in greater detail the teletext decoder of FIG. 1.
Figure 7:
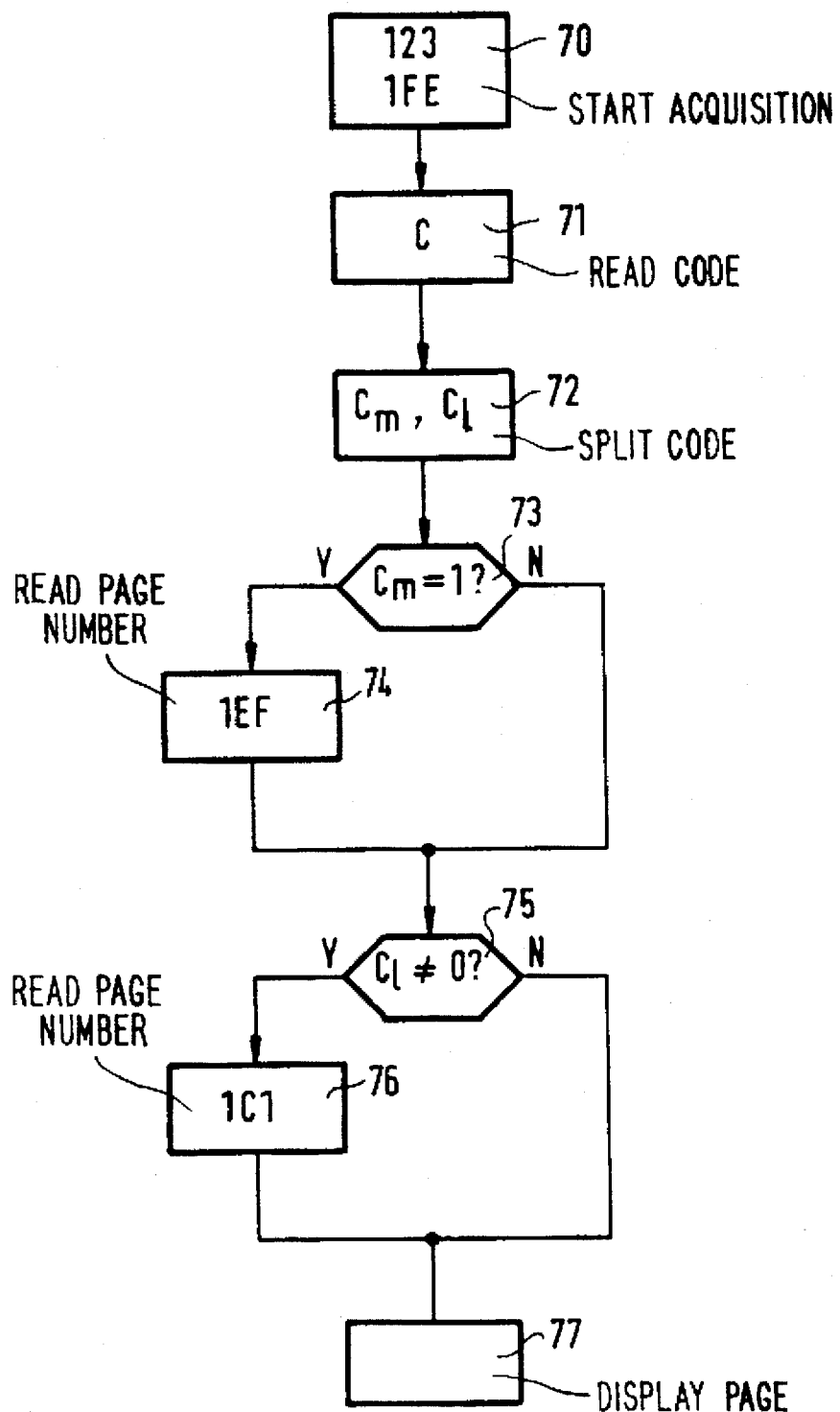
FIG. 7 shows the flow chart of a control programme executed by a microprocessor shown in FIG. 6.

I claim:

1. A method of transmitting teletext pages including a plurality of basic pages and an extension page for enhancing said basic pages, characterized in that the method comprises the step of transmitting a list of extension pages and a table of codes, wherein each code links one of said basic pages to at least one selected extension page, and each code comprises a bit for linking said basic page to a predetermined one of said list of extension pages, and a multibit value identifying a further one of said list of extension pages.

2. A method as claimed in claim 1, characterized in that said bit is in the most significant bit position of each said code.

3. A method as claimed in claim 2, characterized in that said multibit value occupies the three next-most-significant bit positions of each said code.

4. A method as claimed in claim 3, characterized in that transmission of said predetermined one extension page comprises transmitting extension signals which are common for a plurality of basic pages.

5. A method of transmitting teletext pages including a plurality of basic pages and an extension page for enhancing said basic pages, comprising the step of transmitting a table of codes for linking one of said basic pages to said extension page, characterized in that said method further comprises transmitting a plurality of said extension pages, said plurality including a predetermined extension page, and in said step of transmitting a table of codes each code comprises a single bit in a given position for selectively linking said one of said basic page to said predetermined extension page, and a multibit value for identifying a further extension page.

6. A method as claimed in claim 5, characterized in that said given position is the most significant bit position of each said code.

7. A method as claimed in claim 6, characterized in that said multibit value occupies the three next-most-significant bit positions of each said code.

8. A method as claimed in claim 7, characterized in that transmission of said predetermined extension page comprises transmitting extension signals which are common for a plurality of basic pages.

9. A transmission station for transmitting teletext pages including a plurality of basic pages and an extension page for enhancing said basic pages, comprising means for transmitting a table of codes for linking one of said basic pages to said extension page, characterized in that said station further comprises means for transmitting a plurality of said extension pages, said plurality including a predetermined extension page, and said means for transmitting a table of codes transmits in each code a single bit in a given position for selectively linking said one of said basic page to said predetermined extension page, and a multibit value for identifying a further extension page.

10. A station as claimed in claim 9, characterized in that said given position is the most significant bit position of each said code.

11. A station as claimed in claim 10, characterized in that said multibit value occupies the three next-most-significant bit positions of each said code.

12. A station as claimed in claim 11, characterized in that said means for transmitting a plurality of said extension pages comprises means for transmitting extension signals which are common for a plurality of basic pages.

13. A teletext receiver for teletext pages including a plurality of basic pages and an extension page for enhancing said basic pages, comprising means for receiving and decoding a table of codes for linking, for each of said plurality of basic pages, one of said extension pages to the respective basic page, acquisition means for acquiring at least one of said basic pages and extension pages linked thereto, and display means for displaying said one basic page in conformity with signals which are accommodated in the basic page and the extension page linked thereto, characterized in that said receiver further comprises means, responsive to a single bit in a given position of the respective code, for selectively linking said one basic page to said predetermined extension page, and responsive to a multibit value in the respective code for identifying a further extension page.

14. A receiver as claimed in claim 13, characterized in that said given position is the most significant bit position of each said code.

15. A receiver as claimed in claim 14, characterized in that said multibit value occupies the three next-most-significant bit positions of each said code.

* * * * *